March 24, 1964 W. B. STEIN 3,125,798
ADJUSTABLE CUTOFF TOOL
Filed March 6, 1961 4 Sheets-Sheet 1

INVENTOR.
WILLIAM B. STEIN
BY
ATTORNEY

March 24, 1964 W. B. STEIN 3,125,798
ADJUSTABLE CUTOFF TOOL
Filed March 6, 1961 4 Sheets-Sheet 2

INVENTOR.
WILLIAM B. STEIN
BY
ATTORNEY

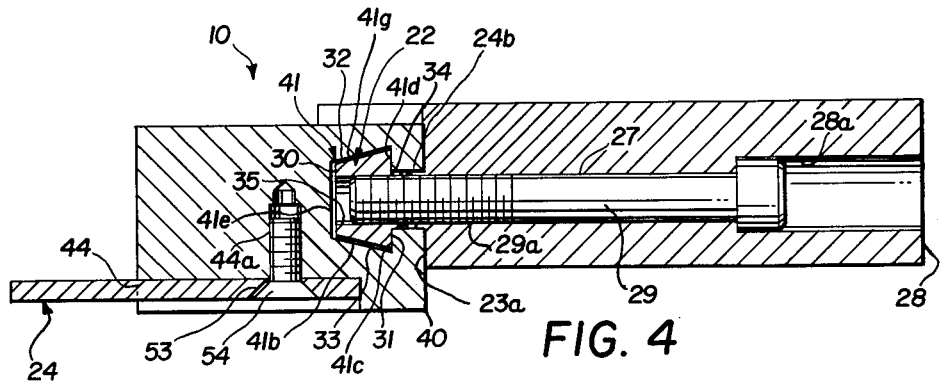
FIG. 4
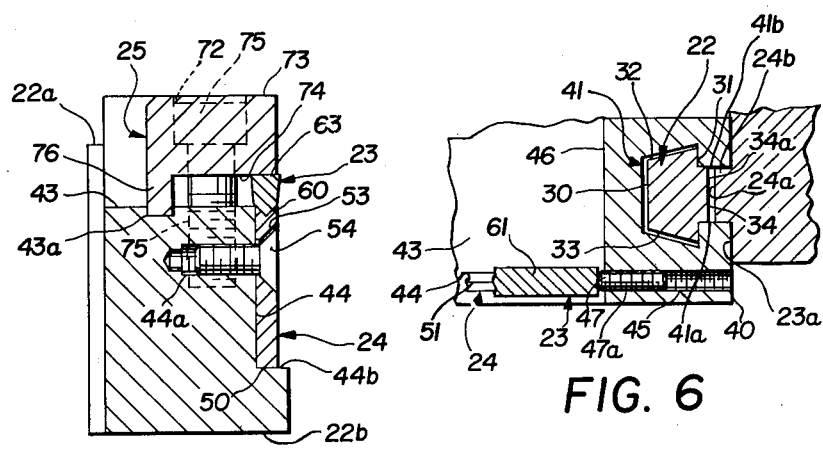
FIG. 5
FIG. 6
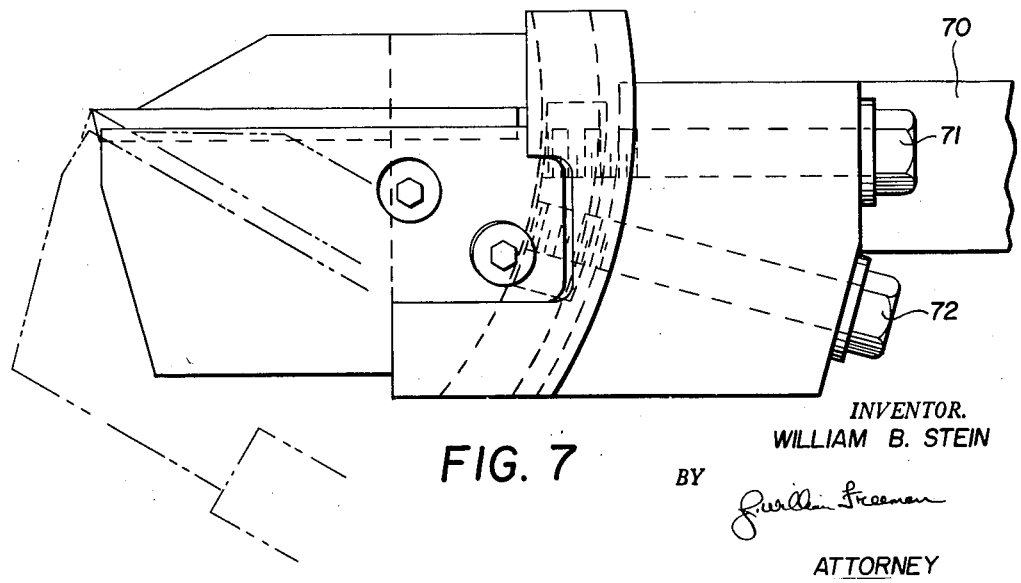
FIG. 7
INVENTOR.
WILLIAM B. STEIN
BY
ATTORNEY

INVENTOR.
WILLIAM B. STEIN
BY
ATTORNEY

United States Patent Office 3,125,798
Patented Mar. 24, 1964

---

3,125,798
ADJUSTABLE CUTOFF TOOL
William B. Stein, Barberton, Ohio, assignor to Manchester Machine & Tool Company, Akron, Ohio, a corporation of Ohio
Filed Mar. 6, 1961, Ser. No. 93,501
9 Claims. (Cl. 29—98)

This invention relates to the art of cutoff tools and in particular has reference to an improvement by which such cutting tools can be made selectively adjustable with respect to the rake angle of cut so that this rake angle can be varied so as to increase the range of effectiveness of the cutting tool.

A cutting tool of the type generally being referred to herein is set forth in United States Patent 2,846,756, issued August 12, 1958, to Raymond E. Novkov. In the cutoff tool of the aforementioned patent there was provided a tool body that was designed to be clamped, or otherwise secured, with respect to a machine tool such as a turret lathe, for example. This tool body, in turn, had releasably secured thereto a thin support blade upon which an elongate cutting insert could be seated with this cutting bit being retained in place by an overhanging clamping member that was releasably clamped with respect to the tool body. The cutting bit was provided with a projecting cutting edge that extended transversely of the projecting end of the cutting bit so as to permit the effectuation of a cutoff operation as clearly described in the aforementioned patent.

While the device of the aforementioned United States patent has enjoyed wide spread commercial acceptance in the trade, it has been discovered that the same is, nonetheless, possessed of certain disadvantages.

First and foremost of these disadvantages is the fact that it has preferably required in all such instances of cutoff to provide certain clearances on cutting bits of this type, with such clearances including "rake" angle clearance that is provided in the top surface of the bit which extends rearwardly of the cutting edge at what is referred to as a "rake angle." Structurally, and in the normal instance, this "rake angle" is the angle that the top surface is inclined with respect to a horizontal plane that passes through the cutting edge.

If the structure of the aforementioned patent will be observed, in detail, it will be noted that there is no means proivded for varying the "rake angle" of the cutoff tool provided therein unless the tool is partially disassembled and the insert bit thereof removed and resharpened on the top surface thereof so as to provide another rake angle.

In instances of production cutoff involving repeated usage of the tool on materials of varying hardness it has been found that this removal of the tool for grinding purposes is, at best, time consuming and further that the same amounts, at best, to a cut-and-try type of arrangement because of the fact that the insert per se must be reinserted after regrinding and a test cut made to determine whether the proper degree of rake angle has been obtained as a result of the resharpening or regrinding.

It has been found that the aforementioned disadvantages can be obviated by making the bit supporting elements of the cutoff tool rotatable with respect to the tool body per se. In this fashion upon providing the mounting head, support blade, clamping element and insert bit as a sub-combination unit, the same will rotate as a unit relatively of the tool body and it will be noted that the angle of cutting rake of the insert can thus be varied by merely rotating this sub-combination relatively of the tool body.

It has been further discovered that if the insert bit is positioned so as to rotate in spoke-like fashion around its projecting cutting edge that even further improved results will be obtained in cutoff operations. Specifically, and by use of an arrangement wherein the cutoff tool rotates around a point that passes through its projecting cutting edge, there will be no change of location of the cutting edge relative to the tool body, even though the remaining portions of the insert will have been moved relatively of the tool body. Thus, the cutting edge will, at all times, in the preferred embodiment of the invention, remain in a fixed plane so that it will never be necessary to reset the machine to vary the height of the point of cutoff contact. This is particularly important in cutoff operations because in such operations the edge of the cutoff tool normally moves through a horizontal plane that passes through the axis of rotation of the revolving work piece that is being cut off.

A detailed description of the purposes and nature of such positioning is set forth in the aforementioned United States Patent 2,846,756, and will not be repeated herein, except for noting that this requisite positioning is not impaired in the instant application because of the fact that the cutting edge remains in a fixed plane during arcuate shifting of the tool bit relatively of the tool body. Thus, regardless of the rake angle the edge will still be maintained in the same plane.

Production of an improved and adjustable cutoff tool having the above desired characteristics accordingly becomes the principal object of this invention, with other objects thereof becoming more apparent upon a reading of the following brief specification, considered and interpreted in the light of the accompanying drawings.

Of the drawings:

FIGURE 4 is a horizontal section taken on the lines 4—4 of FIGURE 2.

FIGURE 5 is a vertical section taken on the lines 5—5 of FIGURE 2.

FIGURE 6 is a horizontal section taken on the lines 6—6 of FIGURE 2.

FIGURE 7 is an elevational view of a modified form of the invention.

Figure 1:
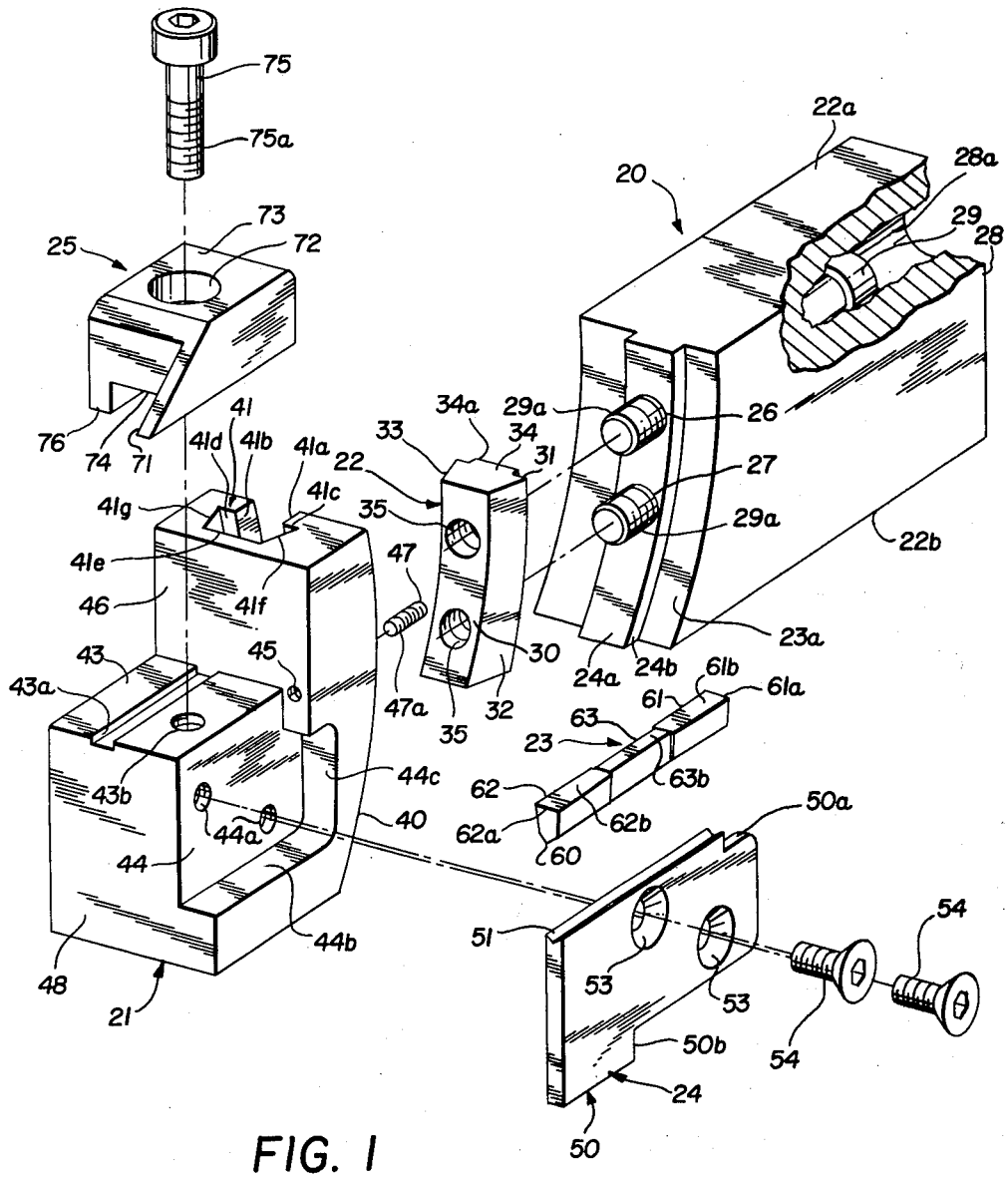
FIGURE 1 is an exploded perspective view of the preferred embodiment of the invention.

Referring now to the drawings and in particular to FIGURE 1, the improved adjustable cutoff tool, generally designated by the numeral 10, includes, in basic essence, a tool body 20 and a mounting head 21 that is adjustably mounted to the tool body 20 through the medium of an arcuate adjustment nut 22; the arrangement being such that the mounting head 21 supports an elongate insert bit 23 in clamped relationship between a support blade 24 and a clamping head 25, while the adjustment nut 22 controls the angular position of the mounting head 21 with respect to the tool body 20.

Considering first the structure of the tool body 20, it will be first noted that the same is of generally elongated block like configuration so as to include opposed top and bottom surfaces 22a and 22b that serve as support surface that can be clamped with respect to the spindle head of a lathe member, for example.

Figures 2, 3:
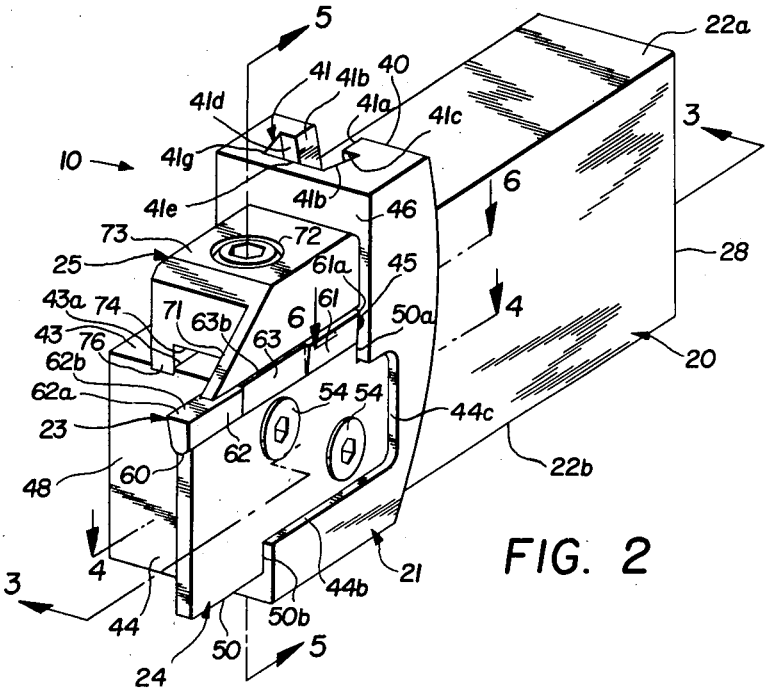
FIGURE 2 is a perspective view showing the component parts in fully assembled position.
FIGURE 3 is a vertical section taken on the lines 3—3 of FIGURE 2.

For the purpose of coaction with mounting head 21, the body 20 further includes a forwardly presented face 23a that is arcuate in cross sectional configuration as clearly shown in FIGURES 1, 2 and 3 of the drawings. The face 23a preferably further includes a projecting rib 24b that also has its projecting face 24a arched in cross section so as to be concentric with the arched face 23a although spaced slightly therefrom in projecting relationship.

A pair of bores 26 and 27 extend longitudinally of body 20 between face 24a and the rear face 28 thereof, with these bores being counter-sunk as at 28a (FIGURE 3) for accommodation of bolt members 29, 29, and with these bolt members 29, 29 each having threaded ends 29a, 29a, as clearly shown in FIGURE 1.

The adjustment nut 22 is designed to be in threaded engagement with the just described threaded ends 29a, 29a, and to this end the same is shown having an arcuate body portion that is defined by opposed faces 30 and 31, with both of these faces 30 and 31 preferably being concentric with respect to the previously described faces 23a and 24a, and with the faces 30 and 31 further being connected by opposed divergent faces 32 and 33. A rib 34 projects from the face 31 and has its projecting face 34a again arched so as to be concentric with the just described faces 30, 31, 23a and 24a. Threaded bores 35, 35 extend between the faces 30 and 34a and threadingly receive the threaded ends 29a, 29a of the bolt members 29, 29.

It has been previously indicated that the mounting head 21 is designed to be adjustably mounted with respect to the body 20 and to this end the mounting head 21 has a rearwardly presented face 40 that has a cross sectional arc of curvature that is preferably substantially concentric to the arcuate face 23a, with this condition of component parts being best shown in the assembled view of FIGURE 3.

For the purpose of receiving the adjustment nut 22 this just described rear face is provided with a dovetail slot 41 that again is concentric with respect to the cross-sectional arc of curvature of the face 40. This just described slot 41 further includes spaced walls 41a and 41b that define an access opening as well as spaced shoulder walls 41c and 41d that connect respectively with walls 41a and 41b. A bottom wall 41e is again preferably concentric in arcuate cross section to the wall 40 and abuts opposed flaring side walls 41f and 41g. If FIGURE 4 will be viewed, it will be noted that the spacing and arrangement of the just described walls permits insertion of the nut 22 therein, with the ribs 24b and 34 also being received between the walls 41a and 41b to obviate transverse shifting of the mounting head with respect to the tool body 20.

In addition to the aforementioned component parts the mounting head 21 further includes support faces 43 and 44, with the support face 42 serving to support the clamping head 25, while the support face 44 serves to support the support blade 24 (see FIGURE 5). A longitudinal slot 43a and a tapped aperture 43b are provided in the surface 43 for coaction with the clamping head 25, while threaded apertures 44a, 44a are provided in the surface 44 for retention of the support blade 24, with blade 24 also seating against adjacent shoulders 44b, 44c.

In addition to the aforementioned component parts, the mounting head 21 further includes a threaded bore 45 that extends rearwardly from face 46 and opens into rear face 40 (see FIGURES 1 and 6). A bolt 47, having threads 47a, is adapted to be threadingly engaged within the just described bore 45, with the end thereof projecting in substantially overlying relationship to surface 44b so as to be adapted to either back or apply shifting pressure against the longitudinal end of bit 23 when the same is seated as shown in FIGURES 2 and 6.

Considering next the detailed structure of support blade 24 it suffices to say that the same is of thin blade-like configuration so as to include bottom edge 50 and a parallel V-shaped top edge 51, with the rearwardly presented edges of the bottom and top portions 50 and 51 being notched, as at 50a and 50b, for abutting engagement against the support surface 46 and front face 48 (see FIGURE 4). For engagement purposes counter-sunk apertures 53, 53 accommodate threaded bolts 54, 54 that are threadingly received in the previously described threaded apertures 44b, 44b. In this fashion when the support blade 24 is positioned in abutment with surface 44 and is further seated with respect to surfaces 44b, 44c and 48, the same may be retained in place by merely inserting the bolts 54, 54 through apertures 53, 53, and into threaded bores 44a, 44a.

Considering next the detailed structure of insert 23, it will first be noted that the same is of elongate configuration and includes a preferably continuous V-shaped bottom surface 60 that is designed to be received in the V-shaped groove 51. Cutting tips 61 and 62 have respective cutting edges 61a and 62a that extend transversely thereof so as to make a reversible type of insert tool, with cutting tips 61 and 62 being brazed or otherwise fused to the central shank 63 preferably in the manner set forth in United States Patent 2,964,833. The top faces 61b, 62b of the cutting tips 61 and 62 are shown as being substantially coplanar with the top face 63b so as to have a zero degree rake angle with respect thereto, although it is to be understood that a positive or negative rake angle could be employed without interfering with the clamping action that is effectuated by the clamping head 25.

Accordingly, and referring to FIGURE 1 for a detailed description of the clamping head 25, it will be seen that the same is of block-like configuration so as to include an integral extension arm 71 that extends forwardly thereof so as to longitudinally overlie the top surfaces of the cutting insert 23 when the same is seated in the V-shaped groove 51. A counter-sunk aperture 72 extends between the top surface 73 and the bottom surface 74 of the clamping head 25 (see FIGURE 5) so that the threaded end 75a of a bolt 75 may be received in the previously described aperture 43b. A guide rib 76 extends longitudinally of one edge of the clamping member 25 for reception in the slot 43a so as to prevent shifting of the clamping block out of overlying relationship to the insert 23 during use.

In use or operation of the improved cutoff tool it will first be assumed that the component parts have been assembled as shown in FIGURE 2 of the drawings and further that the tool body 20 has been clamped in place on a lathe or other machine tool being used to effectuate cutting action.

At this time and referring to FIGURES 2 and 3, it will be noted that the longitudinal extent of the insert 23 is such that the same is substantially parallel with the top surface 22a of the tool body 20. If it is desired to vary this angle of the insert 23 so as to, in effect, create an acute angle between the longitudinal extent of the insert 23 and the top surface 22a, it is merely necessary that the bolts 29, 29 be slightly backed off from engagement with the adjustment nut 22. This loosening will permit a release of the clamping pressure that has been applied by the arcuate face 31 of the nut 22 and at such time the entire mounting head 21, including all component parts associated therewith, may be shifted relatively of the tool body. In the preferred form of the invention and referring to the full and chain dotted line positions of FIGURE 3, this shifting will take place around a center line that lies substantially within the projecting cutting edge 62a. Accordingly, the rake angle that is defined by the top surface 62b (FIGURE 3) will be changed between the full and chain dotted line positions of FIGURE 3. When the proper rake angle has been established it is merely necessary that the bolts 29, 29 be retightened, at which time the adjustment shoe will be drawn towards the support member 22, with the result that the face 31 thereof will engage the faces 41c and 41d of the dove tail slot and draw the shoe 22 to face 23a. This movement will in turn draw face 40 into abutted relationship with face 23a and thus lock the same against additional shifting relatively of the body member 20.

When such adjustment has been accomplished as just described, it is believed obvious that no resetting of the tool will be required in view of the fact that the height of the cutting edge 62a will have remained constant during such adjustment. It is further to be noted that no adjustment of tool height will be required even in the event of cutting tool failure due to the fact that the cutting edge 62a will always be positioned at the same height with respect to the tool body.

The FIGURE 7 modification relates only to a variation in the form of the tool body 20 which is modified to have an extension 70 that may be clamped in other types of equipment. Additionally, the bolts 71, 72 that replace the bolts 29, 29 of FIGURES 1 to 6 are set at an angle to each other for accessibility purposes.

Figure 8:
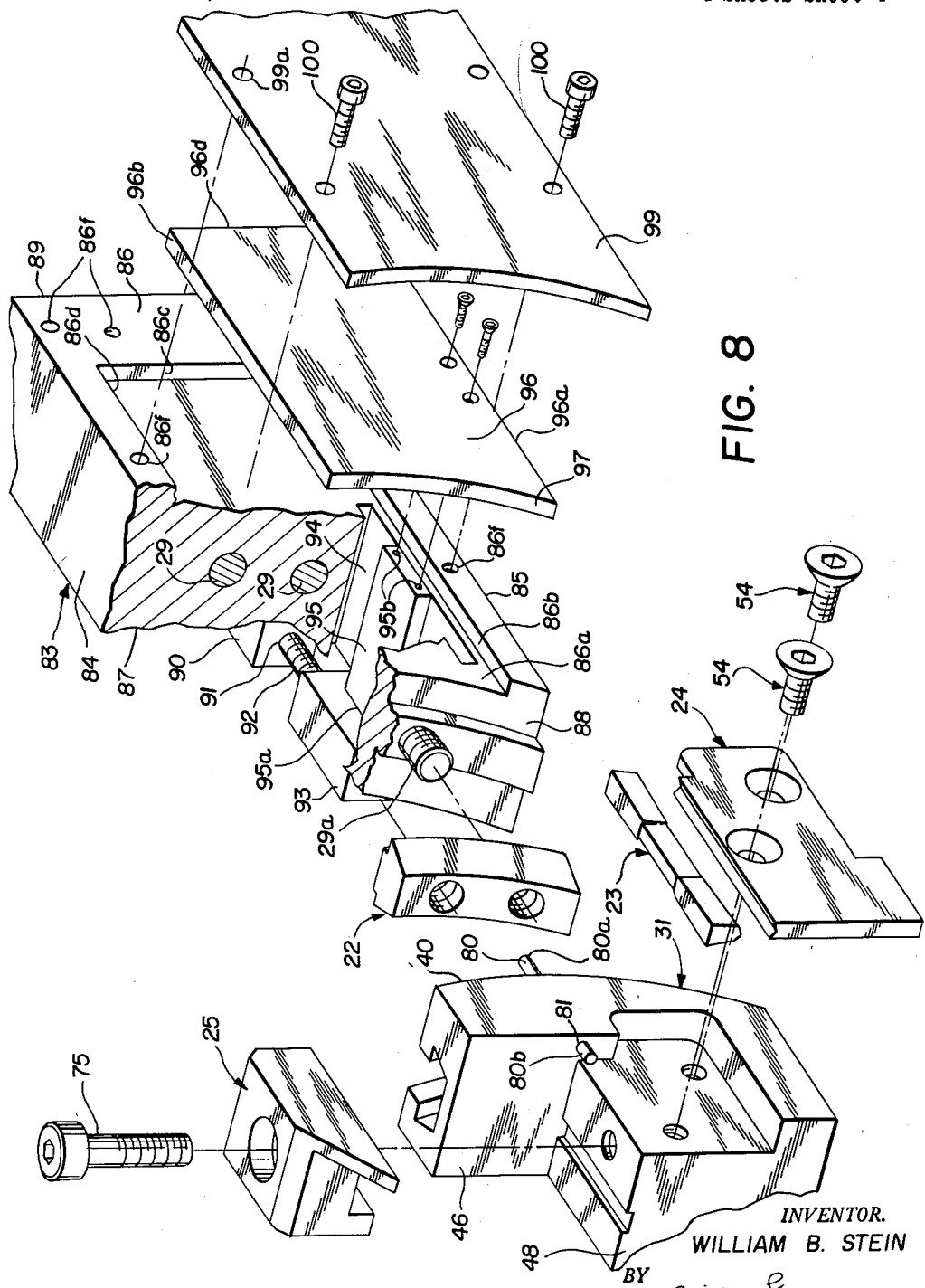
FIGURE 8 is a perspective and exploded view of a still further modification of the invention.

The operating principle of the modified form of the invention shown in FIGURE 8 is, in basic essence, similar to that shown and described in connection with FIGURES 1 through 6, with this form of the invention being designed for use with different types of machine tools that require the presence of a different type of clamping surface and that would not, accordingly, be usable with a tool body of the type described in FIGURES 1 through 6.

Accordingly, while the construction of the tool body 20 of FIGURES 1 through 6 has been materially altered in the FIGURE 8 modification, the construction of the adjustment nut 22, the cutting insert 23, the support blade 24, and the clamping head 25 is identical to that previously described in connection with FIGURES 1 to 6 and, accordingly, no redescription of these components will be undertaken in connection with this modification.

Also, it should be noted that the construction of the mounting head 21 is altered only with respect to the construction of the opening 45 thereof. In the modification of FIGURES 1 to 6 this bore was threaded for reception of a bolt 47. In the FIGURE 8 modification the bore 81 is merely a plain bore that extends between the faces 40 and 46 for reception of a guide rod 80, with the guide rod 80 being slidable axially of the bore 81. Accordingly, no further redescription of mounting head 21 is deemed required.

Considering, however, the detailed construction of the modified tool body 83 that is shown in FIGURE 8, the same is again of block-like configuration so as to include a top surface 84, a bottom surface 85, opposed side surfaces 86 and 87, a front surface 88 and a rear surface 89, with the surfaces 84 and 85 preferably being parallel to facilitate clamping in a machine tool and with the surface 88 conforming in arcuate contour to the previously described surface 23a that was described in connection with FIGURES 1 to 6 of the drawings.

In addition to the just described surface, the tool body 83 further includes a lug 90 that is either integral with or is rigidly secured to the face 87 and which further includes a threaded opening 91 within which the threaded portion of a threaded bolt 92 may be received. The projecting end of the bolt 92 bears against a slide block 93 that slides against the face 87 so as to be reciprocal longitudinally of the tool body 84 upon rotation in opposite directions of bolt member 92.

In addition to the just described component parts, the surface 86 is further provided with an offset surface 86a, that is bounded by shoulders 86b, 86c and 86d, with this face opening into the front face 88, as clearly shown in FIGURE 8. Extending transversely between the faces 86a and 87 is an elongate slot 94 that receives therein a transversely extending slide block 95, with the arrangement being such that the opposed ends 95a and 95b for the slide block 95 are respectively secured to the block member 93, and a cam plate 96, with these last described members being secured to the block 95 by the usual interconnection between threaded apertures and bolt members as clearly illustrated in FIGURE 8.

The cam plate 96 is of substantially blade-like configuration and has a height corresponding to the height dimension existent between the shoulders 86b and 86d, and further has a length dimension that is appreciably shorter than the longitudinal distance between the shoulder 86c and the front wall 88. In this fashion the shoulders 86b and 86d will serve as guide ways for the bottom and top edges 96a and 96b of the cam plate, while the rear edge 96d thereof will seat against the shoulder 86 when adjustment screw 92 has been backed to its extreme condition. The front edge 97 of the cam plate 96 serves as a seat for the end 80a of the slidable pin member 80 and it, accordingly, becomes apparent that as the cam plate 96 is shifted longitudinally of the surface 86a that an equivalent shifting of pin 80 will occur in apertures 81. In this regard and in the same fashion that the rear end of the cutting tool was aligned with the axis of the bore 45, the inboard end of cutting insert 23 will be engaged by the end 80b of the pin member 80, with the result that shifting of the pin member 80 will result in shifting of the insert 23 relative of the support blade 24, clamping plate 25, and mounting head 31. A cover plate 99, having the same planar outline as the overall face portion 86, is provided for retention of the cam plate 96 against surface 86d, with apertures 99a being provided therein so that the same may be bolted or otherwise secured in overlying relationship to the cam plate 96 when the same is positioned against wall 86a. Appropriately located threaded bores 86f, 86f are provided in the face 86 for reception of the threaded ends of bolt members 100, 100 that are provided for this purpose.

The use or operation of the modified form of the invention shown in FIGURE 8 operates, from an angular adjustment standpoint, exactly identical to that previously described in FIGURES 1 through 6, with loosening of the bolts 29, 29 permitting angular shifting of the mounting head 31 upon loosening of the bolts, and preventing such angular shifting upon tightening thereof.

In the FIGURE 8 modification, however, adjustment of the amount of projection of the insert tool 23 beyond face 48 is facilitated by turning of the socket end of the threaded screw 92, with such turning causing longitudinal shifting of the slide block 93, the cross slide 95 and the cam plate 96 as a unit. Such shifting additionally will cause an equivalent axial shifting of the rod 80 due to the contact between the end 80 thereof and the arcuate end 97 of cam plate 96. Shifting of the rod 80 will, accordingly, upon proper loosening of the clamping head 25 permit shifting of the insert 23.

It will be noted that this feature of shifting the insert bit relatively of the support plate 24 does not interfere with the angular adjusting feature previously described in view of the fact that the arcuate contour of the edge 97 is arcuate, although not necessarily concentric with the surfaces 88 and 40.

While it will be seen from the foregoing that the instant application has particular utility with reference to cut-off tools it is to be understood that the invention is not intended to be so restricted in view of the fact that the principles disclosed herein could be adapted to other cutting operations where rake angle variation is desired.

It will be seen from the foregoing that there has been provided a new and improved type of adjustable cutoff tool that is characterized by the fact that the usual desirable features of cutoff operation can be obtained while additionally performing the added desirable feature of adjusting the rake angle of cutoff so as to permit consecutive operation on materials having different degrees of hardness.

It should be further noted that the incorporation of this angular adjustment feature has been effectuated in such a manner so as to obviate destruction of the desirable features of cutoff operation that were set forth in earlier prior United States Patent 2,846,746, with special attention being drawn to the fact that longitudinal adjustment of the cutoff tool can still be accomplished, notwithstanding the incorporation of angularity adjustment feature above discussed.

It will further be noted how the concept of rotating the tool around the cutting edge obviates the necessity for continuous resetting with the result that angular adjustment of the rake angle can be efficient without the necessity for resetting the tool in any fashion following such adjustment.

While a full and complete disclosure of the invention has been set forth in accordance with the dictates of the Patent Statutes, it is to be understood that the invention is not intended to be limited to the specific embodiment herein shown.

Accordingly, modifications of the invention may be resorted to without departing from the spirit hereof or the scope of the appended claims.

What is claimed is:

1. An adjustable cutoff tool of the character described, comprising:
   (A) an elongate tool body having a forward end;
   (B) a cutting head
      (1) longitudinally aligned with said forward end of tool body in shiftable relationship therewith,
      (2) and projecting forwardly thereof;
   (C) an elongate tool releasably carried by said cutting head and having a cutting edge presented forwardly of said head;
   (D) arcuate guide means, including
      (1) mating arcuate faces supported with respect to said body and said head and interconnecting the same,
      (2) having a common axis of rotation,
      (3) mechanically locking said head against transverse shifting relatively of said body and further guiding said head through shifting movement relatively of said body around said axis of rotation;
   (E) and locking means moving said head longitudinally of said body into and out of locked engagement with said forward end of said tool body.

2. The cutoff tool of claim 1 wherein said axis of rotation of said guide means is forwardly of said head adjacent said cutting edge of said tool.

3. An adjustable cutting tool of the character described, comprising;
   (A) a tool body
      (1) having a longitudinal dimension and a forwardly presented face of substantially arcuate configuration;
   (B) a mounting head
      (1) having a longitudinal dimension and forwardly and rearwardly presented faces with such rearwardly presented face being complemental in arcuate contour to the arcuate contour of said forwardly presented face of said tool body;
   (C) an elongate cutting tool
      (1) supported by said mounting head in substantantial parallelism with the longitudinal dimension thereof
      (2) and having a cutting edge that is disposed forwardly of said forwardly presented face of said mounting head;
   (D) arcuate guide means longitudinally aligning each body and head while rotatably supporting the rearwardly presented face of said mounting head in abutted relationship with respect to the forwardly presented face of said tool body, with said arcuate guide means having its center defined by said cutting tool whereby the rake angle of said cutting tool can be varied upon rotation of said mounting head with respect to said tool body;
   (E) and locking means drawing said mounting head longitudinally of said tool body into locked engagement with the forwardly presented face of said tool body whereby rotational movement between said mounting head and said tool body may be obviated.

4. The device of claim 3 further characterized by the fact that said tool body has a rearwardly presented face from which said locking means may be actuated.

5. An adjustable cutting tool of the character described, comprising;
   (A) a tool body having a longitudinal dimension and further having
      (1) a rearwardly presented face,
      (2) a forwardly presented front face of substantially arcuate configuration, and
      (3) at least one bore interconnecting said front and rear faces of said tool body;
   (B) at least one bolt received in said bore and having its threaded end projecting beyond said forwardly presented face
   (C) a mounting head having a longitudinal dimension and further having a forwardly presented face and a rearwardly presented face that is complemental in arcuate configuration of said forwardly presented face of said tool body and that further includes an elongate dovetail slot;
   (D) an elongate cutting tool
      (1) supported by said mounting head in substantial parallelism with the longitudinal dimension thereof
      (2) and having a cutting edge that is disposed forwardly of said forwardly presented face of said mounting head;
   (E) and an adjustment nut
      (1) having a threaded bore receiving the projecting threaded end of said bolt and being shifted by said bolt between clamped and unclamped positions and
      (2) having opposed faces slidably engageable with the sidewalls of said dovetail slot whereby said slot may move relatively of said nut when the same is in its unclamped position while relative movement between said slot and said nut is precluded when said nut is in its clamped position
      (3) said bolt and said adjustment nut longitudinally aligned said body and said head with each other, with said arcuate surfaces of said faces being drawn into abutment with each other upon movement of said adjustment nut to clamping position.

6. The device of claim 5 further characterized by the fact that said nut and said slot are of complemental arcuate cross section with the center of said arcs being defined by said cutting edge.

7. The device of claim 5 further characterized by the fact that said rearwardly presented face of said mounting head and said forwardly presented face of said tool body are of complemental arcuate section with the center of said arcs being defined by said cutting edge.

8. An adjustable cutting tool of the character described, comprising;
   (A) a tool body
      (1) having a longitudinal dimension and a forwardly presented face of substantially arcuate configuration;
   (B) a mounting head including
      (1) a body element having forwardly and rearwardly presented faces with such rearwardly presented face being complemental in arcuate contour to the arcuate contour of said forwardly presented face of said tool body;
      (2) a thin support blade secured to a side portion of said body element in longiudtinal alignment with said tool body and having a forward edge that projects beyond said forwardly presented face of said body element,
      (3) and a clamping member releasably secured to said body element and having an elongate clamping surface that overlies a substantial portion of the upper edge of said support blade;
   (C) an elongate cutting tool
      (1) clamped in seated condition on said upper edge of said support blade by said clamping surface (2) and having a cutting edge disposed slightly forward of the projecting edge of said support blade whereby said support blade supports said cutting tool throughout substantially all of its length;

(D) arcuate guide means longitudinally aligning said body and head while rotatably supporting the rearwardly presented face of said mounting head in abutted relationship with respect to the forwardly presented face of said tool body, with said arcuate guide means having its center defined by said cutting tool whereby the rake angle of said cutting tool can be varied upon rotation of said mounting head with respect to said tool body;

(E) and locking means drawing said mounting head longitudinally of said tool body into locked engagement with the forwardly presented face of said tool body whereby rotational movement between said mounting head and said tool body may be obviated.

9. The device of claim 8 further characterized by the presence of adjustment means carried by said mounting head and being operable to move said cutting tool forwardly on said support blade.

References Cited in the file of this patent

UNITED STATES PATENTS

| | | |
|---|---|---|
| 862,809 | Conklin | Aug. 6, 1907 |
| 1,991,494 | Dempsey | Feb. 19, 1935 |
| 2,458,244 | Bohl | Jan. 4, 1949 |
| 2,555,386 | Zimmerman | June 5, 1951 |
| 2,846,756 | Novkov | Aug. 12, 1958 |

FOREIGN PATENTS

| | | |
|---|---|---|
| 904,081 | France | Feb. 12, 1945 |